No. 857,745. PATENTED JUNE 25, 1907.
F. MESINGER.
TIRE.
APPLICATION FILED DEC. 12, 1906.
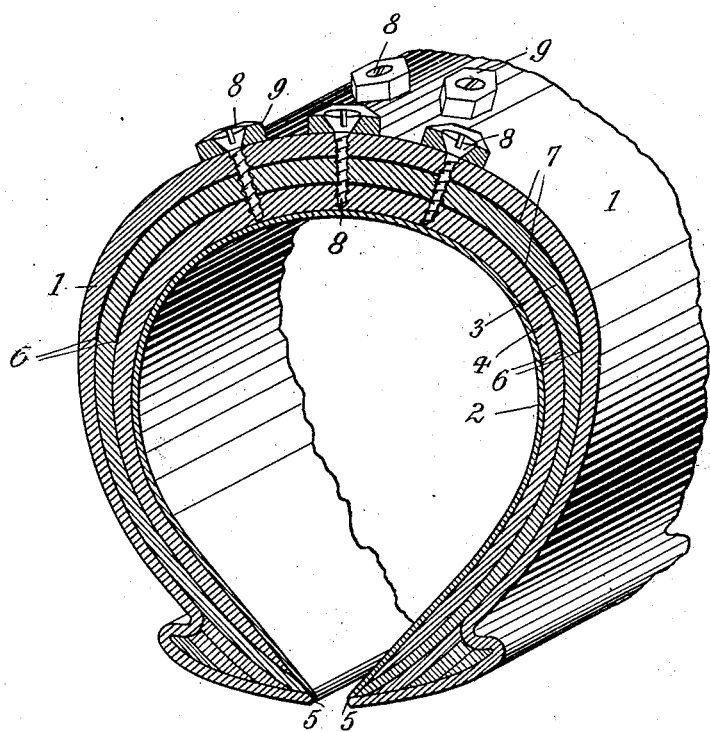
Witnesses
Arthur Gumpz.
William Schulz.
Inventor
Frederick Mesinger
By his Attorney

UNITED STATES PATENT OFFICE.

FREDERICK MESINGER, OF NEW YORK, N. Y.

TIRE.

No. 857,745.  Specification of Letters Patent.  Patented June 25, 1907.

Application filed December 12, 1906. Serial No. 347,401.

*To all whom it may concern:*

Be it known that I, FREDERICK MESINGER, a citizen of the United States, residing at New York city, Bronx, county and State of New York, have invented new and useful Improvements in Tires, of which the following is a specification.

This invention relates to an improved tire which is so constructed that the friction between the layers, of which the tire is composed, is greatly reduced at the tread, so that overheating is prevented and the life of the tire is considerably prolonged.

The accompanying drawing represents a perspective view, partly in transverse section, of my improved tire.

The tire is composed of an outer covering 1 an inner lining 2, and a suitable number of intermediate layers 3, 4, all preferably made of leather. The several superposed layers described are cemented to each other at both sides of the tire, that is, from the ends 5 to points 6, situated to the right and left of the tread. Between the points 6, 6, *i. e.*, at the tread, the cement is omitted, so that the layers here remain disconnected from each other. At these disconnected or central portions of the layers, there is interposed between them, a suitable solid anti-friction material 7, such as a mixture of graphite and oil. In this way overheating of the tire is prevented, while furthermore the flexibility of the tread is considerably increased.

Through the tread of the tire pass a suitable number of screws 8 that carry the runners 9, and also serve to hold the tire-layers together at their uncemented central sections. These screws engage the layers 1, 3 and 4, and thus pass through the graphite-containing interstices between such layers.

It will be seen that by my invention the tire is provided with a yielding anti-friction tread, which is not apt to become overheated, so that the life of the tire and its running qualities are considerably increased.

I claim:

1. A tire composed of a series of superposed layers cemented to each other at the sides and detached at the tread, and of a solid anti-friction material between the detached portions of the layers, substantially as specified.

2. A tire composed of a series of superposed layers cemented to each other at the sides and detached at the tread, a solid anti-friction material in the interstices between the layers, and screws engaging the layers and passing through said interstices, substantially as specified.

Signed by me at New York city, (Manhattan,) N. Y., this 11th day of December, 1906.

FREDERICK MESINGER.

Witnesses:
 FRANK V. BRIESEN,
 WILLIAM SCHULZ.